(No Model.)

D. ARNDT.
LAWN MOWER.

No. 338,132. Patented Mar. 16, 1886.

WITNESSES
Edwin L. Yewell.
Chas. D. Davis

INVENTOR
Daniel Arndt
By C. M. Alexander
Attorney

UNITED STATES PATENT OFFICE.

DANIEL ARNDT, OF CLEVELAND, OHIO.

LAWN-MOWER.

SPECIFICATION forming part of Letters Patent No. 338,132, dated March 16, 1886.

Application filed April 8, 1885. Serial No. 161,534. (No model.)

*To all whom it may concern:*

Be it known that I, DANIEL ARNDT, a citizen of the United States, residing at Cleveland, in the county of Cuyahoga and State of Ohio, have invented certain new and useful Improvements in Lawn-Mowers, of which the following is a specification, reference being had therein to the accompanying drawings.

My invention relates to improvements in lawn-mowers, and is designed to produce a mower that will effectually cut grass, leaving an even surface after once having been passed over the lawn.

The improvement consists, essentially, in the use of a double row of reciprocating teeth, and a roller with a single zigzag groove operating both sets of teeth simultaneously.

Figure 1:
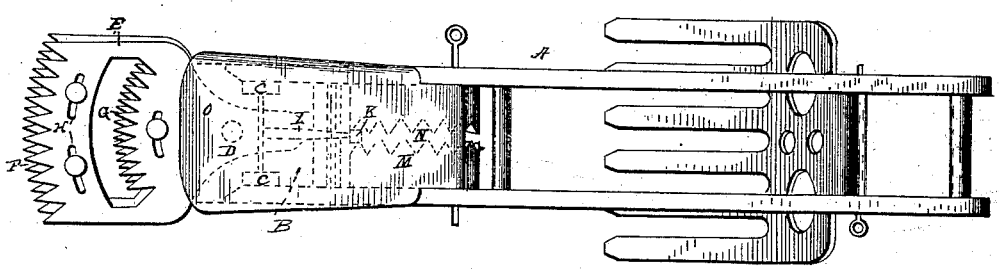
Figure 2:
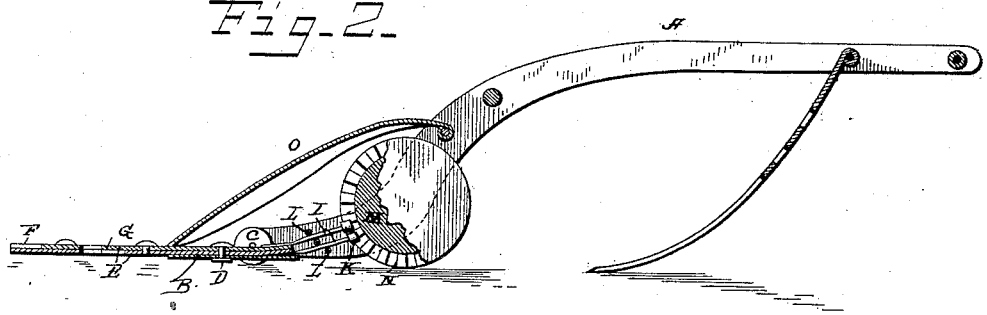
Figure 3:
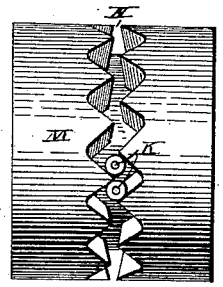

In describing the device reference is had to the annexed drawings, in which Figure 1 represents a plan view of the mower; Fig. 2, a longitudinal section, and Fig. 3 a detail showing the roller.

A frame, A, of suitable form and dimensions, carries at its forward end a plate, B, through which project rollers C, supporting the said end and the cutting-teeth from contact with the ground. On this plate B is a pivot, D, securing to the machine the toothed plates E, forming the cutters of the machine. Each plate has its outer edge provided with cutting teeth or knives F, either formed thereon or secured thereto, and arranged in a segmental curve of which the pivot is the center. A set of cutting-teeth, G, in each plate project into a slot behind the teeth F and curve from the same center. One of the plates is provided with slots H, arranged in a curve struck from the same center, through which pins in the other plate project, said pins retaining the plates in close contact. On short projections of the plates to the rear of the pivot are arms or rods I, carrying at their free ends friction-rollers K, and guided and supported by bearing-rods L.

Journaled in the frame A is the driving-roller M, having a single zigzag groove, N, within which rest both the rollers K. It is clearly evident that as the roller revolves the arms or rods I and consequently the plates bearing the cutting-knives will reciprocate simultaneously, but in opposite directions. The knives crossing one another give a shear cut, effectually performing their office. The movement of both plates simultaneously makes the travel thereof necessary for the cut much less than though one were stationary, and hence performing the work more rapidly. The supplementary cutters G will clip off any of the grass that may have passed the first set.

A guard, O, protects the operating mechanism from being clogged by the cut grass, and a rake swinging from the rear of the frame enables the operator to gather the cut grass into windrows or piles preparatory to removal.

Either man or horse power may be used.

Since it is customary to build machines of different styles, but all embodying the same principles, to attract sales and also meet the wants of different parties, the right to vary the construction without departing from the spirit of the invention is reserved.

I claim—

1. A lawn or other mower having two plates reciprocating concentrically and simultaneously, said plates each carrying a main set of cutting teeth or knives, and also a supplementary set of cutting teeth or knives to the rear of the main set, substantially as and for the purpose specified.

2. In a lawn or other mower, the combination, with concentrically-moving plates, each carrying a main and a supplementary set of cutting knives or teeth, and having rearward extending arms, of a driving-roller having a single zigzag groove in which the said rearward arms rest, substantially as and for the purpose specified.

In testimony whereof I affix my signature in presence of two witnesses.

DANIEL ARNDT.

Witnesses:
JOHN M. HULL,
SIMON R. THORMAN.